United States Patent [19]

Tiefenbach et al.

[11] Patent Number: 4,602,760
[45] Date of Patent: Jul. 29, 1986

[54] FUEL LINE BUNDLE CLAMP

[76] Inventors: Karolyn L. Tiefenbach, 14128 Hubbell, Livonia, Mich. 48154; Helmut Warmbold, 11393 Canterbury Dr., Sterling Heights, Mich. 48077

[21] Appl. No.: 555,762

[22] Filed: Nov. 28, 1983

[51] Int. Cl.⁴ .............................................. F16L 3/08
[52] U.S. Cl. .................................. 248/544; 248/74.3; 248/68.1; 403/408.1; 24/458; 24/297
[58] Field of Search ................. 248/73, 74 A, 74 PB, 248/544, 65, 74.3, 68.1; 403/408, 71; 24/457, 458, 297, 453, 667

[56] References Cited

U.S. PATENT DOCUMENTS

| | | | |
|---|---|---|---|
| 2,937,834 | 5/1960 | Orenick | 24/573 |
| 3,157,377 | 11/1964 | Orenick | 248/544 |
| 3,269,680 | 8/1966 | Bryant | 248/74 PB |
| 3,550,219 | 12/1970 | Van Buren | 248/73 |
| 4,185,800 | 1/1980 | Kabel | 248/73 |
| 4,334,659 | 6/1982 | Yuda | 248/73 |
| 4,347,999 | 9/1982 | Sato | 248/73 |
| 4,352,589 | 10/1982 | Allison | 403/408 |
| 4,403,377 | 9/1983 | Mizusawa | 24/297 |

FOREIGN PATENT DOCUMENTS

| | | | |
|---|---|---|---|
| 2734753 | 2/1979 | Fed. Rep. of Germany | 248/74 A |
| 599050 | 3/1948 | United Kingdom | 248/74.3 |

Primary Examiner—Reinaldo P. Machado
Assistant Examiner—Alvin Chin-Shue

[57] ABSTRACT

A bundle type clip or clamp for holding a number of axially aligned cylindrical objects such as fuel conduits together and in a desired relation to a static structure such as a vehicle body or frame. The clamp has an elongated body portion with a conduit encircling mid-portion and with molded end portions adapted to interfit with one another when brought together to form a generally cylindrical male-type attachment plug for insertion into a female-type member which in turn, interfits with a hole in the vehicle body or frame. The male plug portion has a contour which permits the male and female members to be secured together in a loose preassembly relationship and a configuration permitting a postassembly relationship which secures the fuel conduits tightly together.

4 Claims, 5 Drawing Figures

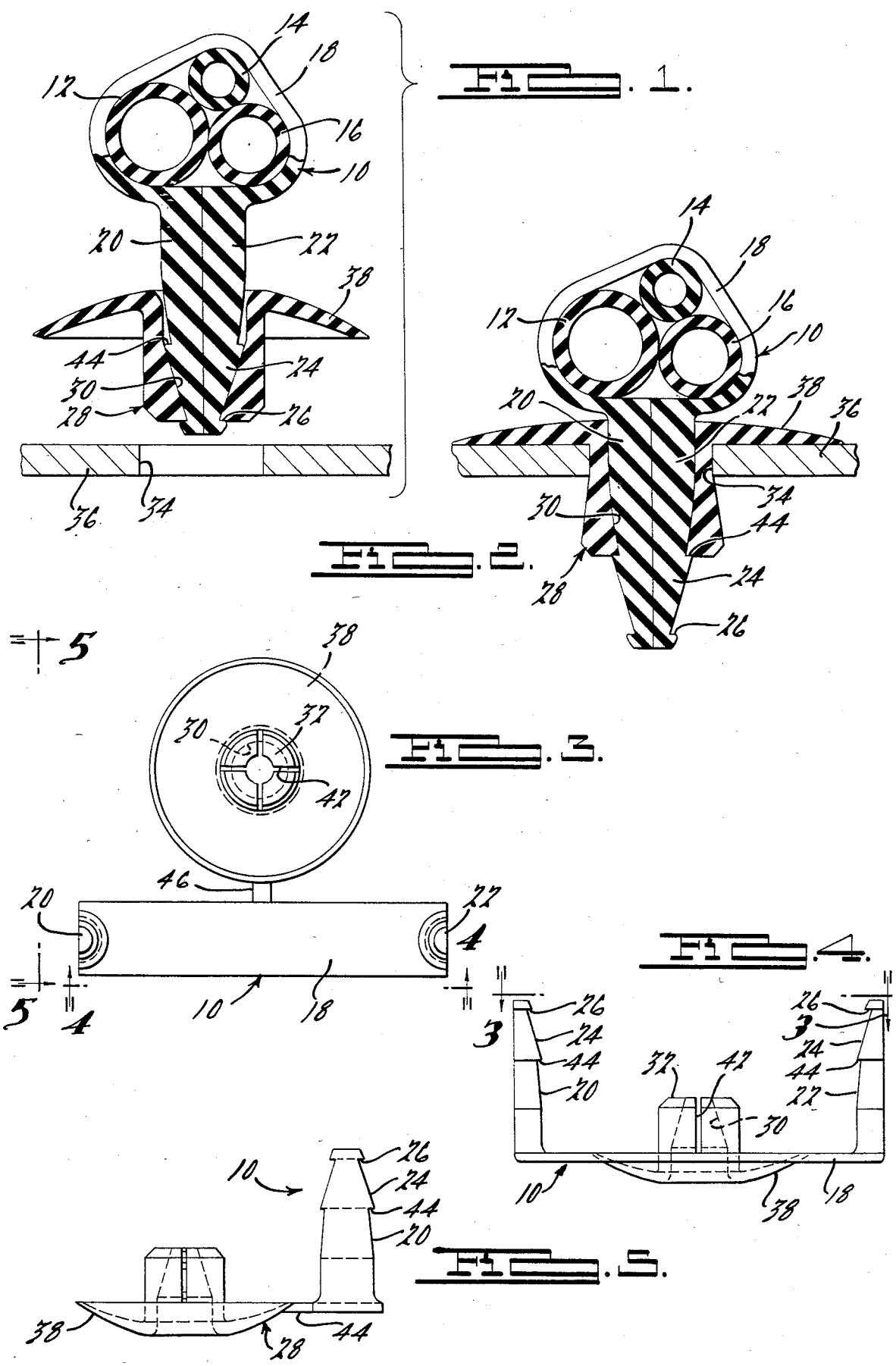

FUEL LINE BUNDLE CLAMP

BACKGROUND OF THE INVENTION

This invention relates to bundle type clamps for holding a number of cylindrical tubes together and in relation to a static structure.

Present day vehicles require several conduits or tubes extending from the fuel tank to the engine compartment. One conduit delivers fuel to the engine compartment, another conduit returns excess fuel back to the fuel tank and still another conduit connects the upper portion or vapor chamber of the fuel tank with the emission control equipment including a vapor cannister. It has long been recognized that it would be desirable to provide a bundle clamp for the tubes or conduits which would secure the tubes together and also position and secure the tubes in relation to a body or frame member of the vehicle. Also, it is desirable to provide a bundle clamp with a preassembly positional relationship so that the bundle clamp can be secured around the tubes prior to final assembly to the vehicle structure. In this preassembly relationship, the bundle clamp loosely encircles the tubes and is ready for attachment to the vehicle without the addition of accessory parts or pieces. Of course, it is necessary that the bundle clamp attach in a totally secure manner to the vehicle so that vibrations during usage of the vehicle will not loosen the attachment of the clamp to the vehicle nor loosen the attachment of the clamp around the conduits or tubes.

An example of a bundle clamp somewhat similar to the subject clamp is disclosed in U.S. Pat. No. 4,371,137 which issued to Anscher. The Anscher device includes an encircling end portion for conduits or the like which includes a provision for locking and unlocking the circular end portion for attachment around the tubes. The other end of the Anscher device includes a barbed end adapted to be inserted through a hole in a static structure so that upon insertion a predetermined distance, barbed end portions expand to secure the clamp in the opening.

The U.S. Pat. No. 3,909,883 to Fegen discloses an attachment means similar to that described in relation to the Anscher device in that an end portion with radially expandable barbs is insertable in an opening in a structure. Upon a predetermined insertion, the barbed ends expand and secure the device to the structure.

Neither the Anscher nor the Fegen devices provide the advantageous features of the subject invention which are discussed in more detail hereinafter. Specifically, neither of the aforementioned patents disclose a bundle clamp formed from elongated member with a thin, flexible midportion adapted to encircle a number of tubes or conduits. The end portions of the subject bundle clamp are specifically configured so that when brought together about the tubes, they interact to form a generally circular male-type plug member. The male-type plug member is adapted to be received into an annularly shaped female receiver configured to interfit through an opening in a static structure such as a vehicle body. The female-type member and the male plug member are configured so that the two may be connected together in a preassembly relationship allowing the female member to be inserted in the opening in the static structure. The configuration permits the male member to be inserted further from the preassembly position so that the female member is locked into the opening in the static structure and simultaneously the midportion of the bundle clamp engages the conduits tightly.

An advantage of the aforementioned bundle clamp which is the subject of this application is its simplicity and ability to be preassembled around a number of fuel conduits prior to final assembly while allowing the bundle clamp to be easily secured to a static structure without adding other parts or pieces.

The utility of the wire clamp is enhanced by its construction with a relatively thin and flexible tube engaging midportion and end portions configured so that together they form a generally cylindrical male plug member for insertion into a female member itself adapted to engage a stationary support member.

Further advantages of the subject bundle clamp will be more obvious from a reading of the following detailed description of a preferred embodiment, reference being had to the accompanying drawings which disclose the preferred embodiment.

IN THE DRAWINGS

FIG. 1 is a partially sectioned view of the subject bundle clamp secured about 3 conduits and showing the clamp in a preassembly relationship with respect to a supporting structure;

FIG. 2 is a view similar to FIG. 1, but showing the bundle clamp in a finally assembled relationship with respect to the male and female portions and the static structure;

FIGS. 3, 4 and 5 are planer and elevational views of the subject bundle clamp in an as-molded configuration of elastomeric material prior to preassembly about the tubes as shown in FIG. 1.

DETAILED DESCRIPTION

In FIG. 1, the subject bundle clamp is shown by the numeral 10. The bundle clamp encircles and secures together a plurality of fuel line conduits or tubes 12, 14 and 16. The conduits or tubes 12, 14 and 16 are encircled by a relatively thin and flexible midportion 18 of the bundle clamp.

The midportion of the bundle clamp 10 terminates in molded end portions 20 and 22 perhaps best illustrated in FIGS. 3-5. The end portions 20 and 22 are mold formed in semi-cylindrical configurations so that when the midportion 18 is curved about the tubes 12, 14 and 16 to encircle the tubes, the ends interface with one another and cooperate to form a generally cylindrical male-type plug portion illustrated in FIGS. 1 and 2.

The male plug portion shown in FIGS. 1 and 2 includes a generally cylindrical portion shown in the vicinity of numerals 20 and 22 in FIGS. 1 and 2. A conically shaped portion 24 is formed further from the end of the portions 20 and 22. At the extreme end of the end portions 20 and 22, an enlarged end configuration is provided defining a radially outwardly extending edge surface, 26.

As shown in the figures, and particularly FIGS. 1 and 2, the end portions 20 and 22 forming the plug member are adapted to engage a female receiving member 28. Specifically, the female receiving member 28 includes a conically tapered aperture 30 through its central portion. The conically formed aperture 30 terminates in a smaller diameter opening through the end surface 32 of the member 28 as best shown in FIGS. 3 and 4. As best shown in FIGS. 1 and 2, the central apertured portion of member 28 is adapted to be inserted through an opening or hole 34 in a support structure such as the body or a frame member 36 of a vehicle. The female receiving member 28 also is provided with a radially outwardly extending annular flange 38 which as shown in FIG. 2 flattens against the surface of the support member 36 when the bundle clamp is in an assembled relationship. This provides a relatively sealed and protected security between the bundle clamp portion 28 and the member 36.

As is clear from examining FIGS. 1 and 2, the female receiving member is adapted to be inserted through the opening 34 in member 36 and then the central aperture of member 28 is expanded radially outwardly to secure member 28 to member 36. In FIG. 1, the bundle clamp 10 is shown in a preassembly configuration in which the conically configured portions 24 of end portions 20 and 22 are inserted within the similarly configured conical aperture 30. This does not cause the central portion of the female member 28 to be radially expanded outwardly. The edge 26 formed on the end of the members 20 and 22 engage the end surface 32 of the member 28 to retain the end portions 20 and 22 within the member 28 in the preassembled position shown in FIG. 1. After the central apertured portion of the female member 28 is inserted through the opening 34 in member 36, further insertion of portions 20 and 22 into the aperture 30 of the member 28 will cause the central aperture to expand radially outward as shown in FIG. 2. This locks the member 28 to the member 36. To facilitate the radially outward expansion of the apertured central portion of member 28, a plurality of slots 42 are formed in the central portion as shown in FIGS. 3-5. Finally, the end portions 20 and 22 are secured in the assembled position shown in FIG. 2 by interaction between an edge surface 44 formed between the generally cylindrical portions in the vicinity of numerals 20 and 22 and the conically configured portions 24. The edge portions 44 engage the radially expanded end surfaces 32 of the apertured central portion of member 28.

It should be noted in FIGS. 3-5, the two portions of the bundle clamp 10 may be molded in a one piece assembly including the male-like member formed by portions 18, 20 and 22 and the female-like member 28 formed by the central apertured portion and the surrounding flange portion 38. A thin web or connector 46 joins the two pieces and this portion is cut or torn to separate the male and female portions when the bundle clamp is assembled around the tubes and pressed into the preassembly position shown in FIG. 1.

Only one embodiment of the inventive bundle clamp has been illustrated in the drawings and discussed in detail heretofore. However, one advantageous feature has been illustrated, namely the formation of a simple bundle clamp consisting of a flexible midportion and end portions interacting one to another when brought into juxtaposition thus forming a male-like plug member adapted to be received by a corresponding female member. Another feature is also illustrated, namely the configurations of the male plug member and the apertured female member with conically configured surfaces and an end portion retainer so that the members may be preassembled into essentially an integral bundle clamp capable of insertion through an opening in a support structure. Further, the feature relating to the configuration of the male plug and the female member which locks the portions together within the opening in the support structure and retains them is clearly shown. The one piece molding feature is also illustrated in this specification. Although other embodiments may be contemplated by applicants, it is felt that the illustrated embodiment discussed heretofore, is the best mode of the bundle clamp which illustrates the aforementioned features and the invention is to include obvious variations which fall within the scope of the following claims in which the invention is defined.

What is claimed is:

1. A bundle clamp for securing and positioning tubes or the like with respect to an apertured support comprising:

an elongated first member having a flexible midportion for encircling at least one tube, when wrapped thereabout, the first member having opposite distal end portions relative to the midportion and configured to form a generally cone-shaped male-type plug means when juxtapositioned one with respect to the other after the midportion is wrapped about the tube;

a second member having a substantially cylindrical central body portion adapted to extend into and through the apertured opening of the support, the central body portion defining a conically configured aperture therethrough characterized by a larger diameter entrance means and a smaller diameter exit means which is surrounded by an end surface;

the distal ends of the first member together forming a generally conical surface of the plug means configured to engage the conically shaped aperture of the second member the male-type plug means is inserted partially into the second member insufficiently to preclude radial outward expansion of the central body portion, the distal end portions also defining a radially outwardly extending end shoulder portion with an edge adapted to engage the end surface of the central body portion of the second member when the male-type plug means is partially inserted into the apertured central body portion thus maintaining the first and second members in the interconnected preassembly configuration characterized by the central body portion of the second member in condition to be inserted through the apertured support;

the remainder of the distal end portions of the first member adjacent to the aforesaid inserted portion defining a sufficiently larger dimension to radially outwardly expand the central body portion of the second member against the portions of the apertured support when the male-type plug means is fully inserted into the conically apertured central body portion to a final assembly position.

2. A bundle clamp for securing and positioning tubes or the like with respect to an apertured support comprising:

an elongated first member having a flexible midportion adapted to encircle at least one tube when wrapped therearound, the first member having opposite distal end portions relative to the midportion and configured to cooperate one with another when placed in juxtaposition to thereby form a substantially cone-shaped male-type plug means;

a second member defining a substantially cylindrical central body portion with an axial end both adapted to extend into and through the apertured support, the second member further having a conically configured aperture through the central portion and its end portion adapted to receive the male-type plug means;

the distal ends of the first member being configured so as to form a conically shaped surface of the plug means when the ends are in juxtaposition which surface corresponds to the conically configured aperture in the central body portion of the second member;

the remainder of the distal end portions of the first member adjacent the aforesaid conically shaped surface being of larger diameter and more generally cylindrical so that insertion of the male-type plug means formed thereby fully into the conically configured aperture of the central body portion of the second member producing engagement between the cylindrical portion of the plug means and the conically configured aperture of the second member whereby the walls of the body portion are radially outwardly expanded against the portions of the support surrounding the aperture therein;

an edge forming shoulder between the concially shaped surface portion and the more cylindrical portion of the plug means adapted to engage the axial end of the central body portion of the second member when the male-type plug is fully inserted into the second member whereby the male-type plug means is locked to the scond member in the assembled position characterized by full insertion of the male-type plug means into the aperture the central body portion.

3. A bundle clamp and support for securing and positioning tubes or the like with respect to an apertured support structure comprising:

an elongated first member having a flexible midportion for encircling at least one tube, when wrapped thereabout, the first member having opposite distal end portions relative to the midportion, each end portion having a generally semi-cylindrical configuration including a flat side surface portion and a rounded side surface portion, the end portions cooperatively engaging one another to form elongated plug means having a generally circular cross-section formed when the midportion of the first member is wrapped about at least one tube and the flat side surfaces are arranged into adjacent overlying relation to one another;

the support structure having a cylindrically shaped aperture therethrough;

a second member having a generally cylindrical central body portion defining an outer cylindrical surface with an axial length sufficient to extend into the cylindrical bore of the support member and past the opposite side thereof;

the second member further having a conically shaped tapered bore axially extending therethrough from an entrance portion to a narrower exit portion encircled by an edge forming end surface, the tapered bore being adapted to receive the plug means formed by the juxtapositioned end portions;

the plug means having in series a generally cylindrical portion, a radially outwardly projecting shoulder forming portion, a conically shaped tapered portion narrowing from the shoulder forming portion and a radially outwardly projecting end bead portion;

the conically shaped tapered portion and tapered bore of the plug and of the second member, respectively, being of sufficient dimension so that the radially outwardly extending bead portion of the plug engages the end edge of the second member to secure the first and second members axially together in a first interconnected position whereby the outer surface of the second member is maintained in its non-distorted cylindrical configuration to permit easy insertion of the central body portion of the second member through the cylindrical bore of the support structure;

the generally cylindrical portion of the plug means having sufficient dimension with respect to the conically shaped and tapered bore of the second member when the plug means is axially positioned relative to the second member so that the shoulder means engages the end edge of the second member thereby retaining the plug means axially within the second member in a second interconnected position whereby portions of the second member are distorted radially outwardly with respect to the cylindrical bore in the support structure thereby preventing the second member from being removed from the apertured support structure.

4. A bundle clamp and supporting for securing and positioning tubes or the like with respect to an apertured support structure comprising:

an elongated first member having a flexible midportion adapted to encircle at least one tube when wrapped thereabout, the first member having opposite distal end portions relative to the midportion and each end portion having a generally semi-cylindrical configuration with a flat side surface portion and a rounded side surface portion and with the axis thereof normal to the plane of the midportion, the end portions cooperatively engaging one with the other to form elongated plug means with a generally circular cross-section formed when the midportion of the first member is wrapped about at least one tube and the flat sides of the end portions are arranged into adjacent overlying relation to one another;

the support structure defining a cylindrically shaped bore;

a second member having a central body portion with an outer cylindrical surface of sufficient axial length to extend into the cylindrically shaped bore of the support structure and past the opposite surface thereof;

the second member having a conically shaped and tapered bore therethrough extending from an entrance portion to a smaller exit portion which is encircled by an edge forming end surface, the tapered bore being adapted to receive the plug means formed by the juxtapositioned end portions;

the elongated plug means having a generally cylindrically shaped configuation adjacent the midportion, a radially outwardly projecting shoulder forming portion integrally connected with the cylindrical portion, a conically shaped and tapered portion integrally connected to the shoulder portion and narrowing to an enlarged end bead portion of the plug means;

the first member and the second member and, particularly, the plug means and the central body portion of the first and second members, respectively, being cooperatively interconnected one within the other into first and second assembly positions, the first assembly position being defined by insertion of the plug means just sufficiently into the second member so that the conically shaped and tapered portion thereof is axially aligned wtih the portion of the second member defining the conically shaped and tapered bore therethrough, the second assembly position being defined by a more full insertion of the plug means into the bore of the second member so that the cylindrical portion of the plug means extends adjacent the conically shaped and tapered bore of the second member with the shoulder forming means of the plug member engaging the end edge forming surface to axially maintain the plug means in the second assembly position whereby in the second assembly position, the cylindrical portion is of sufficient dimension to radially outwardly expand the central portion of the second member sufficent to prevent movement of the central body portion outward from the cylindrical bore of the support structure.

* * * * *